US006762927B2

(12) United States Patent
Schnitter et al.

(10) Patent No.: US 6,762,927 B2
(45) Date of Patent: Jul. 13, 2004

(54) NIOBIUM-BASED CAPACITOR ANODE

(75) Inventors: Christoph Schnitter, Holle-Sottrum (DE); Karlheinz Reichert, Wolfenbüttel (DE)

(73) Assignee: H.C. Starck GmbH & Co. KG, Goslar (DE)

( * ) Notice: Subject to any disclaimer, the term of this patent is extended or adjusted under 35 U.S.C. 154(b) by 0 days.

(21) Appl. No.: 09/935,987

(22) Filed: Aug. 23, 2001

(65) Prior Publication Data

US 2002/0080552 A1 Jun. 27, 2002

(30) Foreign Application Priority Data

Aug. 25, 2000 (DE) ........................................ 100 41 901

(51) Int. Cl.[7] .................................................. H01G 9/45

(52) U.S. Cl. ...................... 361/508; 361/509; 361/512; 361/528; 361/529; 429/194; 429/232; 29/25.03

(58) Field of Search ................................ 361/508, 509, 361/512, 514, 516, 528, 529, 530, 502, 504, 503, 524, 511; 429/194, 232, 241; 29/25.03; 75/229, 245

(56) References Cited

U.S. PATENT DOCUMENTS 3,597,664 A * 8/1971 Gerard et al. ................. 29/570
5,187,033 A * 2/1993 Koshiba .................. 429/231.1
6,051,044 A * 4/2000 Fife ............................ 75/229
6,136,062 A * 10/2000 Loffelholz et al. ............ 75/369
6,215,652 B1 * 4/2001 Yoshida et al. ............. 361/524
6,322,912 B1 * 11/2001 Fife ........................... 428/702
6,373,685 B1 * 4/2002 Kimmel et al. ............. 361/508
6,452,777 B1 * 9/2002 Naito ......................... 361/303
6,462,934 B2 * 10/2002 Kimmel et al. ............. 361/508
6,663,687 B2 * 12/2003 Naito et al. ................... 75/232

FOREIGN PATENT DOCUMENTS

| | | |
|---|---|---|
| DE | 198 31 280 | 1/2000 |
| JP | 11329902 | * 11/1999 |
| WO | 00/12873 | 3/2000 |
| WO | 00/15555 | 3/2000 |

OTHER PUBLICATIONS

J. Electrochem. Soc., 130(6), (month unavailable) 1983, pp. 1260–1273, J. Perrière and J. Siejka, Study of the Anodization of Niobium and Tantalum Superimposed Layer by $^{18}O$ Tracing Techniques and Nuclear Microananlysis.

* cited by examiner

*Primary Examiner*—Dean A. Reichard
*Assistant Examiner*—Nguyen T. Ha
(74) *Attorney, Agent, or Firm*—Godfried R. Akorll; Diderico van Eyl

(57) ABSTRACT

An anode is described that has a niobium-based barrier layer, which includes a niobium metal core, a conducting niobium suboxide layer and a dielectric barrier layer of niobium pentoxide.

8 Claims, No Drawings

NIOBIUM-BASED CAPACITOR ANODE

BACKGROUND

The present invention relates to niobium-based anodes for electrolytic capacitors and also to a process for producing such anodes.

In the literature, in particular, the acidic earth metals niobium and tantalum are described as starting materials for the production of such anodes and capacitors. The anodes are produced by sintering finely divided metal powder to produce a structure having a large surface area, oxidation of the surface of the sintered body to produce a nonconducting insulating layer and application of the counter electrode in the form of a layer of manganese dioxide or of a conductive polymer.

Hitherto, only tantalum powder has achieved industrial significance for capacitor production.

The essential specific properties of such capacitors are determined by the specific surface area, the thickness of the oxide layer d forming the insulator and the relative permittivity $\epsilon_r$. The capacitance C is consequently calculated as follows:

$$C = \varepsilon_0 \varepsilon_r \cdot \frac{A}{d} \quad \text{(I)}$$

where $$\varepsilon_0 = 0.885 \cdot 10^{-11} F/m \quad \text{(II)}$$

denotes the dielectric field constant and A denotes the capacitor surface.

The insulating oxide layer of the capacitor is conventionally produced electrolytically by immersing the sintered niobium or tantalum structure that forms the capacitor anode in an electrolyte, conventionally dilute phosphoric acid, and applying an electrical field. The thickness of the oxide layer is directly proportional to the electrolysis voltage, which is applied with initial current limitation until the electrolysis current has fallen to 0. Conventionally, the oxide layer is produced at an electrolysis voltage ("forming voltage") that is equal to 1.5 times to 4 times the intended operating voltage of the capacitor.

The relative permittivity of tantalum pentoxide is conventionally specified as 27 and that of niobium pentoxide is conventionally specified as 41. The growth in thickness of the oxide layer during forming is about 2 nm/V forming voltage for tantalum and about 3.7 nm/V for niobium, with the result that the higher relative dielectric constant of niobium is compensated for by the greater thickness of the oxide layer for an identical forming voltage.

The capacitors are miniaturized by increasing the specific surface area by using finer powders for producing the sintered structure and reducing the sintering temperature.

The required thickness of the insulating oxide layer places limits on the miniaturization of the capacitors, i.e. on the increase in the specific capacitance, since a sufficiently conductive phase for current conduction and limitation of the resultant ohmic heat must still be present within the oxidized sintered structure. The oxidation tendency consequently increases with increasing miniaturization of the capacitors. This applies, in particular, to niobium capacitors, which, compared with tantalum capacitors, require a thicker insulating oxide layer for an identical forming voltage.

It has now been found that the capacitor properties can be advantageously modified if, during the forming, an electrolyte is used that contains a multidentate organic acid anion that forms stable complexes with niobium. Suitable organic acids for use in the forming electrolyte are, for example, oxalic acid, lactic acid, citric acid, tartaric acid, phthalic acid, the preferred acid anion being the anion of oxalic acid.

SUMMARY

The invention relates to an anode having a niobium-based barrier layer comprising (a) a niobium metal core, (b) a conducting niobium suboxide layer, and (c) a dielectric barrier layer comprising niobium pentoxide. The invention also relates to a process for producing an anode for a capacitor comprising sintering niobium metal powders and electrolytically producing a dielectric barrier layer on a surface of a sintered body, in which the barrier layer is produced with an electrolyte that contains an aqueous solution of an organic acid containing an anion. These and other features, aspects, and advantages of the present invention will become better understood with reference to the following description and appended claims.

DESCRIPTION

The invention relates to an anode having a niobium-based barrier layer comprising (a) a niobium metal core, (b) a conducting niobium suboxide layer, and (c) a dielectric barrier layer comprising niobium pentoxide. The invention also relates to a process for producing an anode for a capacitor comprising sintering niobium metal powders and electrolytically producing a dielectric barrier layer on a surface of a sintered body, in which the barrier layer is produced with an electrolyte that contains an aqueous solution of an organic acid containing an anion.

The electrolyte may contain the organic acid in aqueous solution. Preferably, a water-soluble salt of the organic acid is used. Suitable as cations are those that do not adversely affect the oxide layer and whose complex formation constant with the corresponding acid anion is lower than that of niobium with said acid anion, with the result that niobium ions can be replaced by the corresponding metal ions. Preferred are cations that beneficially affect the capacitor properties when they are incorporated in the oxide layer. A particularly preferred cation is tantalum.

Preferred as forming electrolyte, in particular, is an aqueous solution of tantalum oxalate. The invention is described below using the example of tantalum oxalate without restriction of the generality.

The forming process according to the invention achieves capacitors with a capacitance increased by up to about 50% compared with conventional forming in dilute phosphoric acid. The specific leakage current is below 0.5 nA/$\mu$FV.

It was found that the capacitance-increasing effect is the greater, the higher the conductivity of the electrolyte during forming.

The electrolyte concentration is preferably adjusted in such a way that the conductivity of the electrolyte is from about 1.5 to about 25 mS/cm, particularly preferably from about 5 to about 20 mS/cm and, in particular, preferably from about 8 to about 18 mS/cm. 6. In one embodiment, the electrolyte has a conductivity ranging from about 0.15 to about 25 mS/cm.

During forming, it is advantageous to limit the forming current initially to 30 to 150 mA/m$^2$ of anode area. In this connection, forming currents limited to lower values are preferably used in the case of electrolytes with lower conductivity. In the case of higher electrolyte conductivity, the forming currents can be set in the upper range.

The capacitance-increasing effect according to the invention is attributed to a specific surface removal of niobium from the anode structure during forming. Niobium contents in the region of a few wt % of the anode structure used are found in the forming electrolyte after forming. Typically, the niobium dissolution during forming is 3 to 5 wt % and in some cases even up to 10 wt % of the anode structure. Obviously, the surface removal takes place specifically in such a way that the effective capacitor area is increased compared with forming in dilute phosphoric acid. During conventional forming in phosphoric acid, pores are sealed or blocked as a result of the increase in volume due to the formation of the oxide layer, with the result that the effective capacitor surface area is reduced. Obviously, the organic acid anion attacks precisely those surface regions that limit particularly narrow pore channels.

A further advantageous effect of the invention is that the oxide layer is formed in two layers: an outer pentoxide layer that forms the insulating layer and an inner, conductive suboxide layer situated between pentoxide layer and metal core. SEM micrographs of fracture facets of fractured formed anodes reveal very thick oxide layers that correspond to a layer thickness growth of 5 nm/V forming voltage or more, in some cases only a vanishingly small metal core being enclosed. Under the light microscope, color differences (violet/green) reveal that the oxide layer is composed of two adjacent sublayers. The suboxide layer acts as a barrier for oxygen diffusion out of the pentoxide layer and consequently contributes to the long-term stability of the anode.

A further advantage of the invention is that the cation of the electrolyte solution is deposited to a small extent on the anode surface and, because of the diffusion kinetics, is incorporated in a stabilizing manner in the oxide layer in competition with the diffusion of oxygen into the anode and of niobium to the anode surface during oxidation. Thus, tantalum, which does not form stable suboxides, is suitable for stabilizing the pentoxide layer. Since niobium has the higher site interchange probability compared with tantalum (see, for example, J. Perriere, J. Siejka, J. Electrochem. Soc. 1983, 130(6), 1260–1273) the niobium is capable of "jumping over" surface-deposited tantalum during the oxidation, with the result that tantalum does not apparently migrate inwards within the growing oxide layer. It accumulates at the inside of the pentoxide layer and stabilizes it. In the anodes formed according to the invention, tantalum contents are found of about 1500 to about 10000 ppm, predominantly of about 3000 to about 6000 ppm, relative to the anode, the tantalum being concentrated in the pentoxide layer. Some of the capacitance-increasing effect of the present invention is probably attributable to a beneficial effect on the pentoxide layer thickness growth and, optionally, the permittivity.

The invention also relates to anodes having a barrier layer for niobium-based capacitors, comprising a metallic niobium core, a conducting niobium suboxide layer and a dielectric barrier layer of niobium pentoxide. Preferably, the niobium suboxide layer has a thickness of at least about 30 nm, particularly preferably at least about 50 nm.

Particularly preferred anodes according to the invention have a pentoxide barrier layer containing from about 1500 to about 5000 ppm of tantalum, relative to the anode. In one embodiment, the anode according to the invention has a tantalum content in the dielectric barrier layer ranging from about 1500 to about 12,000 ppm, relative to the anode.

The invention is further described in the following illustrative examples in which all parts and percentages are by weight unless otherwise indicated.

EXAMPLES a) Production of Niobium Powder

Niobium powder was used that was produced according to a published proposal of the Applicant (DE 198 31 280 A1). The powder had the following foreign elements contents (ppm):

| | |
|---|---|
| Mg: | 230 |
| O: | 15425 |
| H: | 405 |
| N: | 111 |
| C: | 31 |
| Fe: | 3 |
| Cr: | 2 |
| Ni: | 2 |
| Ta: | 78 |

Furthermore, the following physical properties were determined:

| | |
|---|---|
| a BET surface area of | 4.61 $m^2/g$, |
| an FSSS particle size of | 4.2 μm, |
| a bulk density of | 17.9 $g/inch^3$, |
| a flowability of | 21 s, |

a particle size distribution determined by Mastersizer of

| | |
|---|---|
| D10: | 78.5 μm |
| D50: | 178.4 μm |
| D90: | 288.8 μm |

and also a primary particle size determined by

| | |
|---|---|
| SEM micrographs of about | 550 nm |

b) Production of Nb Anodes:

Anodes were produced from the powder in suitable moulds with the introduction of a tantalum wire with a compressed density of 2.9 $g/cm^3$ and sintered at a temperature of 1125° C. for 20 minutes.

TABLE 1 summarizes the indicated information relating to Examples 1–16:

| | Forming Electrolyte Solution | | | | Capacitor Properties | | |
|---|---|---|---|---|---|---|---|
| Ex. No. | Electrolyte | Ta, wt %, | $C_2O_4^{2-}$, wt % | Conductivity mS/cm | Ta content ppm | CV/g, μFV/g | Ir/CV, nA/μF V |
| 1 | 0.1% $H_3PO_4$ | — | — | 2.53 | n.d. | 80 K | 0.23 |
| 2 | 0.25% $H_3PO_4$ | — | — | 4.58 | n.d. | 87 K | 0.44 |
| 3 | Oxalic acid in $H_2O$ | — | 0.10 | 2.86 | n.d. | 92 K | 0.75 |
| 4 | Oxalic acid in $H_2O$ | — | 0.20 | 5.53 | n.d. | 97 K | 0.83 |
| 5 | Ta oxalate in $H_2O$ | 0.05 | 0.05 | 1.44 | n.d. | 87 K | 0.26 |

TABLE 1-continued summarizes the indicated information relating to Examples 1–16:

| | Forming Electrolyte Solution | | | | Capacitor Properties | | |
|---|---|---|---|---|---|---|---|
| Ex. No. | Electrolyte | Ta, wt %, | $C_2O_4^{2-}$, wt % | Conductivity mS/cm | Ta content ppm | CV/g, μFV/g | Ir/CV, nA/μF V |
| 6 | Ta oxalate in $H_2O$ | 0.1 | 0.07 | 1.77 | 13500 | 89 K | 0.5 |
| 7 | Ta oxalate in 0.1% $H_3PO_4$ | 0.1 | 0.07 | 3.83 | 6700 | 90 K | 0.25 |
| 8 | Ta oxalate in $H_2O$ | 0.3 | 0.21 | 4.86 | 9800 | 103 K | 0.51 |
| 9 | Ta oxalate in $H_2O$ | 0.4 | 0.29 | 6.36 | 3400 | 88 K | 0.64 |
| 10 | Ta oxalate in $H_2O$ | 0.4 | 0.34 | 7.43 | 2800 | 94 K | 0.48 |
| 11 | Ta oxalate in $H_2O$ | 0.5 | 0.35 | 7.8 | 2700 | 108 K | 0.43 |
| 12 | Ta oxalate in $H_2O$ | 0.4 | 0.39 | 8.5 | 3100 | 92 K | 0.57 |
| 13 | Ta oxalate in $H_2O$ | 0.75 | 0.51 | 10.22 | 4600 | 115 K | 0.30 |
| 14 | Ta oxalate in $H_2O$ | 0.75 | 0.53 | 11.41 | 3300 | 123 K | 0.48 |
| 15 | Ta oxalate in $H_2O$ | 1.25 | 0.84 | 16.63 | 5300 | 111 K | 0.49 |
| 16 | Ta oxalate in $H_2O$ | 1 | 1 | 22.8 | 4800 | 141 K | 1.35 |

n.d. = not determined c) Anodization

To produce the insulating oxide layer on the sintered anodes, the latter were immersed in an electrolyte solution and, while limiting the current to 100 mA/g of anode weight, anodized up to a voltage of 40 V at a temperature of 80° C. When the voltage of 40 V was reached, this voltage was maintained for a further 2 hours, in which process the current level dropped towards zero.

The electrolyte solution had the composition specified in Table 1 and the conductivity, which is likewise specified.

d) Measurement of the Electrical Properties

The specific capacitance was measured in a known manner at an alternating voltage of 120 Hz with an alternating voltage of 20 mV with a positive direct-voltage bias of 1.5 V. The leakage current was determined by current measurement at a direct voltage of 28 V. The measurement results are specified in Table 1.

Although the present invention has been described in detail with reference to certain preferred versions thereof, other variations are possible. Therefore, the spirit and scope of the appended claims should not be limited to the description of the versions contained therein.

What is claimed is:

1. An anode comprising:

(a) a niobium metal core, (b) a conducting niobium suboxide layer, and (c) a dielectric barrier layer comprising niobium pentoxide, wherein the conductive niobium suboxide layer is situated between the niobium pentoxide layer and the niobium metal core.

2. The anode according to claim 1, wherein the anode has a tantalum content in the dielectric barrier layer ranging from about 1500 to about 12,000 ppm, relative to the anode.

3. The anode according to claim 1, wherein the suboxide layer has a thickness that is at least about 50 nm.

4. A process for producing an anode for a capacitor comprising sintering niobium metal powders and electrolytically producing a dielectric barrier layer on a surface of a sintered body, wherein the barrier layer is produced with an electrolyte that contains an aqueous solution of an organic acid containing an anion, wherein the anode comprises; (a) a niobium metal core, (b) a conducting niobium suboxide layer, and (c) a dielectric barrier layer comprising niobium pentoxide, wherein the conductive niobium suboxide layer is situated between the niobium pentoxide layer and the niobium metal core.

5. The process according to claim 4, wherein the electrolyte comprises a tantalum oxalate solution.

6. The process according to claim 4, wherein the electrolyte has a conductivity ranging from about 0.15 to about 25 mS/cm.

7. The process according to claim 6, wherein the conductivity of the electrolyte is at least about 5 mS/cm.

8. A capacitor comprising an anode comprising (a) a niobium metal core, (b) a conducting niobium suboxide layer and (c) a dielectric barrier layer of niobium pentoxide wherein the conductive niobium suboxide layer is situated between the niobium pentoxide layer and the niobium metal core.

* * * * *